United States Patent
Yoon et al.

(10) Patent No.: US 7,915,855 B2
(45) Date of Patent: Mar. 29, 2011

(54) PORTABLE TERMINAL AND POWER SUPPLY CONTROL METHOD

(75) Inventors: Won-Chan Yoon, Gum-si (KR); Sung-Kee Kim, Gum-si (KR); Gu-Sup Kim, Daegu Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 800 days.

(21) Appl. No.: 11/797,432

(22) Filed: May 3, 2007

(65) Prior Publication Data

US 2007/0285056 A1     Dec. 13, 2007

(30) Foreign Application Priority Data

Jun. 8, 2006   (KR) .................. 10-2006-0051585

(51) Int. Cl.
*H02J 7/00* (2006.01)
*H02J 1/12* (2006.01)

(52) U.S. Cl. ........ 320/103; 320/106; 320/107; 320/116; 307/46; 307/64; 307/66

(58) Field of Classification Search .................. 320/103, 320/107

See application file for complete search history.

(56) References Cited

U.S. PATENT DOCUMENTS

| | | | |
|---|---|---|---|
| 5,485,073 A | | 1/1996 | Kasashima et al. |
| 5,721,481 A | * | 2/1998 | Narita et al. .................. 320/111 |
| 5,982,141 A | | 11/1999 | Hinohara |
| 6,081,096 A | * | 6/2000 | Barkat et al. .................. 320/124 |
| 6,329,786 B1 | * | 12/2001 | Ono .............................. 320/113 |
| 6,452,362 B1 | | 9/2002 | Choo |
| 2005/0041352 A1 | | 2/2005 | Seo |

FOREIGN PATENT DOCUMENTS

| | | |
|---|---|---|
| EP | 0 392 857 | 10/1990 |
| EP | 1 215 580 | 6/2002 |
| EP | 1215580 | * 6/2002 |
| JP | 11-027873 | 1/1999 |
| JP | 2005-295683 | 10/2005 |

* cited by examiner

*Primary Examiner* — Edward Tso
*Assistant Examiner* — Yalkew Fantu
(74) *Attorney, Agent, or Firm* — Roylance, Abrams, Berdo & Goodman, LLP

(57) ABSTRACT

A portable terminal and power supply control method are provided. The portable terminal having a power supply control feature includes a main battery for supplying power to the portable terminal, an auxiliary battery for supplying power to the portable terminal independently of the main battery, a switch module for controlling the power supply of the main battery and auxiliary battery, and a power unit controller for controlling on-off settings of the switch module and for disconnecting, when a battery level of the main battery is higher than that of the auxiliary battery, the auxiliary battery from the main battery. The battery levels of the main battery and auxiliary battery are measured and are controlled to prevent charging of the auxiliary battery with a charge current from the main battery through switch settings.

28 Claims, 8 Drawing Sheets

PORTABLE TERMINAL AND POWER SUPPLY CONTROL METHOD

CROSS-REFERENCE TO RELATED APPLICATIONS

This application claims the benefit under 35 U.S.C. §119 (a) of Korean Patent Application filed in the Korean Intellectual Property Office on Jun. 8, 2006 and assigned Serial No. 2006-51585, the entire disclosure of which is hereby incorporated by reference.

BACKGROUND OF THE INVENTION

1. Field of the Invention

The present invention relates generally to a portable terminal and, more particularly, to a portable terminal having a main battery and an auxiliary battery, wherein a charge current from the main battery to the auxiliary battery is blocked.

2. Description of the Related Art

In recent years, miniaturization of batteries has enhanced mobility of portable terminals and various added functions have been developed for portable terminals. For example, a portable terminal may include a media player for playing audio and video files pre-stored for foreign-language learning or music listening, a camera for photographing, and a video camera for video-recording.

However, listening to music or playing moving images using a portable terminal results in excessive battery power consumption, and interruption of basic call processing may be caused. A high-capacity battery can help to solve this problem. However, a high-capacity battery tends to increase in size, becoming an obstacle to miniaturization of a portable terminal. Currently, development of a small and high-capacity battery is considered to be very difficult.

SUMMARY OF THE INVENTION

An aspect of exemplary embodiments of the present invention is to address at least the above problems and/or disadvantages and to provide at least the advantages described below. Accordingly, an object of exemplary embodiments of the present invention is to provide a portable terminal having a main battery and auxiliary battery and a power supply control method, where the auxiliary battery can supply power to the portable terminal in cooperation with or independently of the main battery, and a charge current from the main battery to the auxiliary battery is blocked.

Another object of exemplary embodiments of the present invention is to provide a portable terminal having a main battery and auxiliary battery, wherein the use of the main battery and auxiliary battery is efficiently controlled by switch settings.

Another object of exemplary embodiments of the present invention is to provide a portable terminal having a main battery and auxiliary battery, wherein the main battery and auxiliary battery can be selectively recharged according to user selection.

In accordance with an exemplary embodiment of the present invention, there is provided a portable terminal having a power supply control feature. A main battery supplies power to the portable terminal and an auxiliary battery supplies power to the portable terminal independently of the main battery. A switch module controls the power supply of the main battery and auxiliary battery. A power unit controller controls on-off settings of the switch module and disconnects the auxiliary battery from the main battery when a battery level of the main battery is higher than that of the auxiliary battery.

In accordance with another exemplary embodiment of the present invention, a portable terminal with a main battery and an auxiliary battery for supplying power to the portable terminal and a power supply control method, where battery levels of the main battery and auxiliary battery are measured, and the power supply from the main battery and auxiliary battery is selectively performed through switch settings.

In accordance with another exemplary embodiment of the present invention, there is provided a power supply control method for a portable terminal having a main battery and an auxiliary battery where battery levels of the main battery and, if the auxiliary battery is installed, the auxiliary battery are measured. If the measured battery level of the main battery is higher than that of the auxiliary battery, the auxiliary battery is disconnected from the main battery through switch settings. If the measured battery level of the main battery is lower than or equal to that of the auxiliary battery, the auxiliary battery is connected to the main battery through the switch settings.

BRIEF DESCRIPTION OF THE DRAWINGS

The above and other objects, features and advantages of certain exemplary embodiments of the present invention will be more apparent from the following detailed description in conjunction with the accompanying drawings where the same drawing reference numerals will be understood to refer to the same elements, features and structures, and in which.

DETAILED DESCRIPTION OF EXEMPLARY EMBODIMENTS

Figure 1:
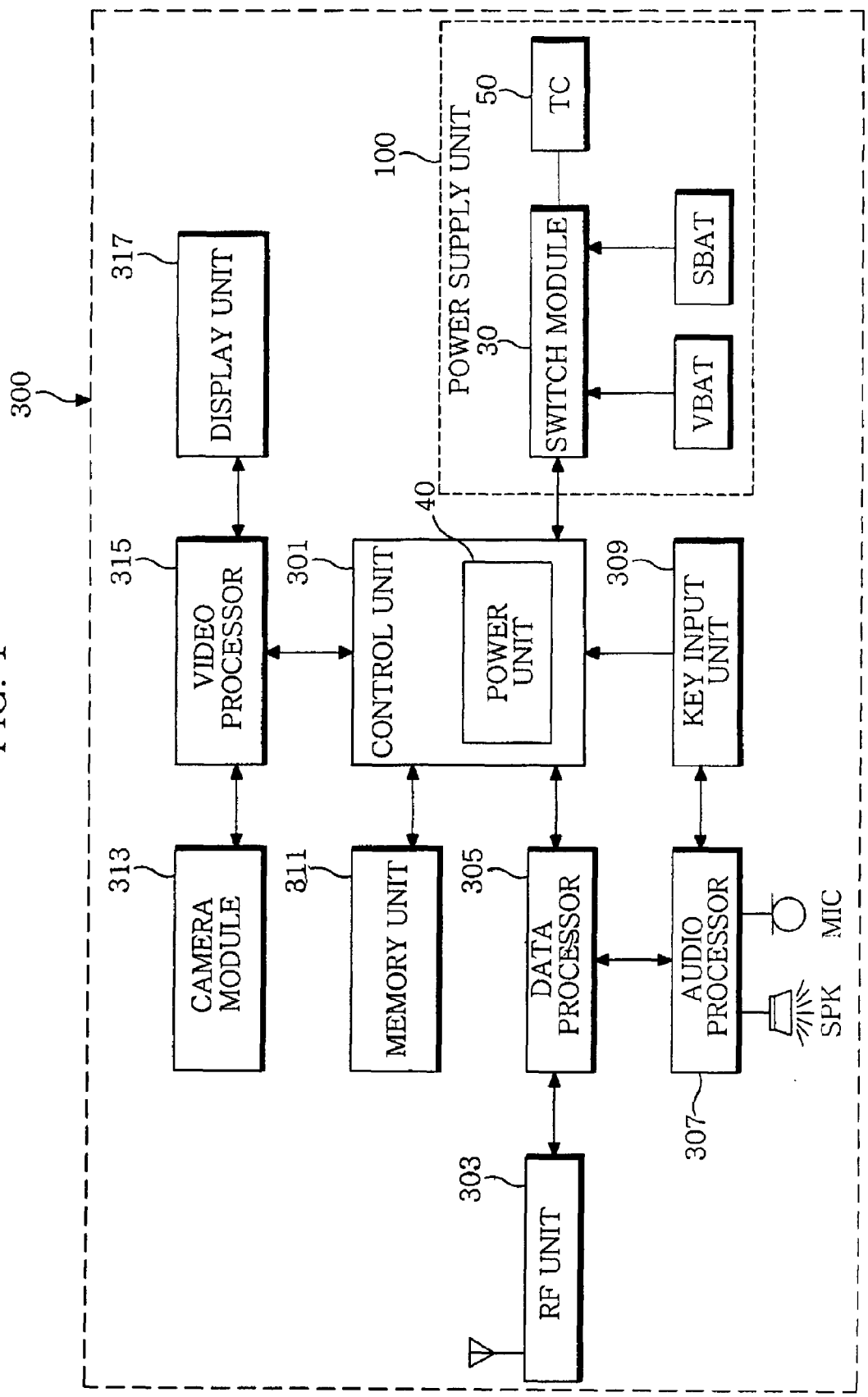
FIG. 1 illustrates a configuration of a portable terminal according to an exemplary embodiment of the present invention.

Hereinafter, certain exemplary embodiments of the present invention are described in detail with reference to the accompanying drawings. As noted above, the same reference symbols identify the same or corresponding elements in the drawings. Descriptions of well-known functions and constructions are omitted for clarity and conciseness. The meaning of specific terms or words used in the specification and the claims is no intended to limit the scope of the invention. The description of the various embodiments is to be construed as exemplary only and does not describe every possible instance of the invention. Therefore, it should be understood that various changes may be made and equivalents may be substituted for elements described below without departing from the spirit and scope of the present invention.

Exemplary embodiments of the present invention relate to a portable terminal having a main battery and auxiliary battery and power supply control method, where the auxiliary battery can supply power to the portable terminal in cooperation with or independently of the main battery, and a charge current from the main battery to the auxiliary battery is blocked.

A main battery and an auxiliary battery can be rechargeable batteries (also called a secondary cell). The auxiliary battery may be a disposable battery (also called a primary cell), but a rechargeable battery may be preferable for environmental protection.

Although, for the purpose of description, a mobile communication terminal is described as an example of a portable terminal in certain embodiments of the present invention, the present invention is not limited to a mobile communication terminal. The portable terminal according to exemplary implementations of the present invention includes, but is not limited to, a terminal having an auxiliary battery for user convenience, and may be any information and communication appliances and multimedia appliances, such as a mobile communication terminal, mobile phone, wireless phone, personal digital assistant (PDA), smart phone, international mobile telecommunications 2000 (IMT 2000) terminal, universal mobile telecommunications system (UMTS) terminal, and digital broadcast receiving terminal. The portable terminal may also be applied to applications using such appliances.

FIG. 1 illustrates a configuration of a portable terminal according to an exemplary embodiment of the present invention.

Referring to FIG. 1, the portable terminal 300 includes an input means, a processing means, a storage means, an output means, a communication means, and a power supply unit 100.

The input means includes an audio processor 307 for processing voice data from a microphone, a key input unit 309 for inputting alphanumeric data from the user, and a camera module 313 for inputting image data by photographing a target object. If a liquid crystal display (LCD) screen of a display unit 317 has a touch-screen capability, the display unit 317 may be included in the input means. The input means acts to input multimedia data composed of audios, numerals/characters and images.

The processing means includes a video processor 315 for converting image data from the camera module 313 into a digital signal, and for producing data to display battery level indicators related to the power supply unit 100; a data processor 305 for processing sound data to and from the audio processor 307 and alphanumeric data input by the user through the key input unit 309; and a control unit 301 for controlling internal components of the portable terminal 300. The processing means processes user data of voices, numerals/characters and images input through the input means, controls connection and disconnection of a main battery VBAT and auxiliary battery SBAT through switch settings, and measures battery levels of the batteries and controls display of corresponding battery level indicators.

The storage means stores user data and camera image data input through the input means, data related to added functions of the portable terminal 300 such as a short message service (SMS) and a multimedia message service (MMS), and switch setting information for control of the main battery VBAT and auxiliary battery SBAT. The storage means includes a memory unit 311.

The output means includes the display unit 317 for displaying user input data or data necessary for an added function on a screen, and the audio processor 307 for processing audio data to be externally output. The output means outputs user data input through the input means, outputs user data and related data stored in the storage means, and outputs screen data associated with added functions and battery levels of the main battery VBAT and auxiliary battery SBAT.

The communication means performs wireless transmission of user data to another user, and connects to an external Web server to transmit and receive contents. The communication means includes a radio frequency (RF) unit 303 and at least one antenna. The communication means may further include a digital multimedia broadcasting (DMB) receiver (not shown) for reception of a DMB signal.

The power supply unit 100 supplies power to the input means, processing means, storage means, output means, and communication means. The power supply unit 100 includes the main battery VBAT installed at the portable terminal 300, the auxiliary battery SBAT connectable to the portable terminal 300, and a switch module 30 for controlling connection and disconnection of the main battery VBAT and the auxiliary battery SBAT. The power supply unit 100 may further include a travel charger (TC) 50 for charging the main battery VBAT and auxiliary battery SBAT. The power supply unit 100 is controlled in response to a control signal from a power unit controller 40. The auxiliary battery SBAT acts as a power source for the portable terminal 300. In an exemplary implementation, the auxiliary battery SBAT may be installed within the portable terminal 300, but may also be installed outside the portable terminal 300.

The power unit controller 40 controls the power supply unit 100 through signal transmission. Although, in FIG. 1, the power unit controller 40 is included in the control unit 301, it may also be included in the power supply unit 100 independently of the control unit 301.

Each component is described in more detail as follows. The RF unit 303 performs communication operations related to phone calls, SMS or MMS services and data communications. The RF unit 303 includes an RF transmitter for upconverting the frequency of a signal to be transmitted and amplifying the signal, and an RF receiver for low-noise amplifying a received signal and downconverting the frequency of the signal. For signal transmission, the RF unit 303 establishes a radio channel to a mobile communication system.

The data processor 305 encodes and modulates a signal to be transmitted through the RF unit 303, and demodulates and decodes a signal received through the RF unit 303. The signal may carry, for example, an SMS or MMS message.

The audio processor 307 reproduces an audio signal from the data processor 305 through a speaker SPK, and outputs an audio signal, such as a voice signal, input from a microphone MIC to the data processor 305.

The key input unit 309 includes numeric, character and function keys for inputting numeric and character information from a user and for setting various functions.

The memory unit 311 may include a program memory section and a data memory section. The program memory stores control programs for controlling the overall operation of the portable terminal 300, and, for example, switch setting information for the power unit controller 40. The data memory section stores data resulting from performance of call processing and added functions in the portable terminal 300.

The camera module 313 obtains image or video data by photographing a target object, and converts the image or video data into a digital signal using an encoder (not shown) for further processing.

The video processor 315 generates screen data to display a digital signal from the camera module 313, and compresses and decompresses video data. The video processor 315 controls display of battery level indicators on the display unit 317 using battery level data from the power unit controller 40.

The display unit 317 provides a user interface for composing and viewing SMS or MMS messages, and displays moving images pre-stored or received in real-time by a DMB receiver. In particular, as illustrated in FIGS. 2A to 2D, the display unit 317 displays battery level data from the power unit controller 40 in various manners.

Figure 2A:
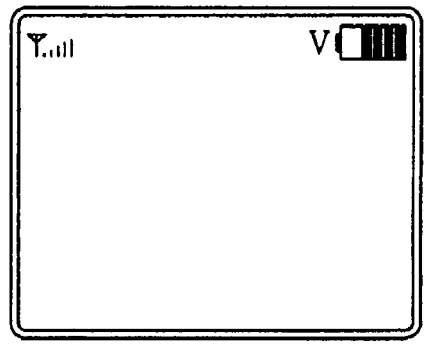
FIGS. 2A to 2D illustrate exemplary displays of battery level indicators on a screen of the portable terminal of FIG. 1.

In the case when the auxiliary battery SBAT is not installed, the power unit controller 40 measures the battery level of the main battery VBAT and sends the measured battery level data to the display unit 317, which then displays the battery level data as a bar at the upper right of the screen, as shown in FIG. 2A.

Figure 2B:
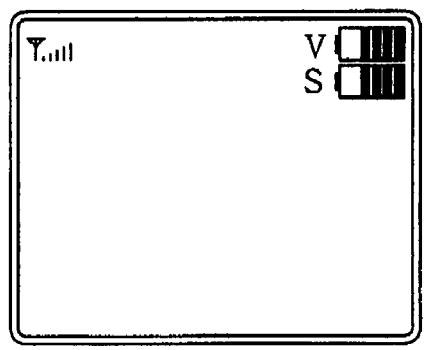

When the auxiliary battery SBAT is installed, the power unit controller 40 measures battery levels of both the main battery VBAT and auxiliary battery SBAT and sends the measured battery level data to the display unit 317, which then displays the battery level data of the main battery VBAT and auxiliary battery SBAT as two stacked bars at the upper right of the screen, as shown in FIG. 2B.

Figure 2C:
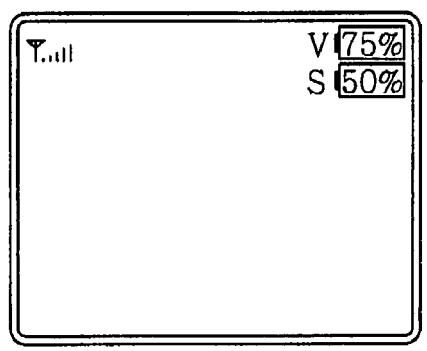
Figure 2D:
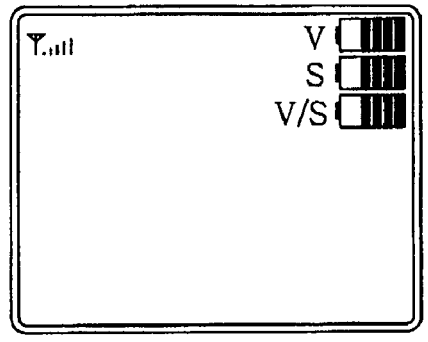

Alternatively, when the auxiliary battery SBAT is installed, the power unit controller 40 measures battery levels of both the main battery VBAT and auxiliary battery SBAT, computes a combined battery level of both batteries, and sends the measured and combined battery level data to the display unit 317, which then displays the measured and combined battery level data as three stacked bars at the upper right of the screen, as shown in FIG. 2D.

As shown in FIG. 2C, measured battery level data of the main battery VBAT and auxiliary battery SBAT may be displayed as numerical percentages on the screen of the display unit 317. Measured battery level data of the main battery VBAT and auxiliary battery SBAT may be displayed in various manners with respect to, for example, display order and shapes of battery level indicators.

The control unit 301 controls the overall operation of the portable terminal 300. For example, the control unit 301 controls signal exchange between components of the portable terminal 300. In the present embodiment, the control unit 301 includes the power unit controller 40 for controlling power supply of the main battery VBAT and auxiliary battery SBAT. The power unit controller 40 monitors the main battery VBAT and auxiliary battery SBAT, generates and sends a battery control signal to the switch module 30, and sends battery level data of the main battery VBAT and auxiliary battery SBAT to the video processor 315.

The power unit controller 40 controls the switch module 30 for controlling operations related to power supply, recharging, and measurement of battery levels of the main battery VBAT and auxiliary battery SBAT. Timing of on-and-off operations of the switch module 30 is described in connection with FIGS. 4A to 4C.

Figure 3:
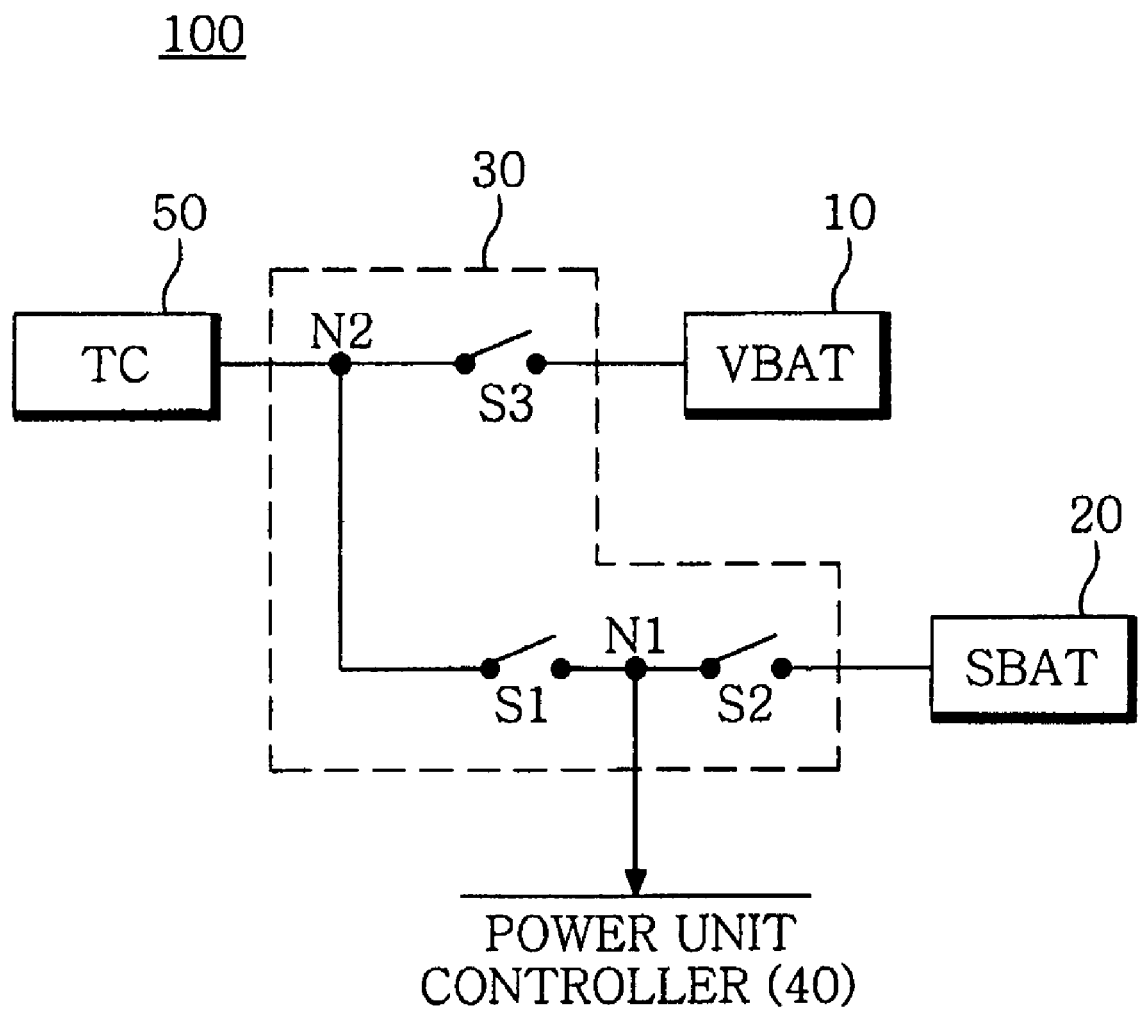
FIG. 3 illustrates an exemplary structure of a power supply unit of the portable terminal of FIG. 1.

FIG. 3 illustrates a structure of the power supply unit 100 of the portable terminal 300.

Referring to FIG. 3, the power supply unit 100 includes the main battery VBAT acting as a primary power source, the auxiliary battery SBAT acting as a secondary power source, and the switch module 30 for controlling power supply of the main battery VBAT 10 and auxiliary battery SBAT 20. As noted above, the power supply unit 100 may further include a TC 50 for charging the main battery VBAT and auxiliary battery SBAT. On-and-off operation of the switch module 30 is controlled by the power unit controller 40 (illustrated in FIG. 1).

The main battery VBAT acts as a primary power source of the portable terminal 300, and can be built-in or installed therein. The main battery VBAT is rechargeable, and may include a secondary cell such as a nickel-cadmium cell or lithium-ion cell, or a chemical cell. In an exemplary implementation, a lithium-ion cell is utilized for the portable terminal 300.

The auxiliary battery SBAT is a separately formed element from the portable terminal 300, and acts as a secondary power source of the portable terminal 300. Thereto, an interface means such as a connector or cable is provided to a side surface of the portable terminal 300 for connection of the auxiliary battery SBAT. The auxiliary battery SBAT may be one of a primary cell, secondary cell and chemical cell. In an exemplary implementation, the auxiliary battery SBAT is the same as the main battery VBAT in type for portability and recharging.

The auxiliary battery SBAT may be coupled to the portable terminal 300 in the form of an external battery pack or a part of an external case (described later). The auxiliary battery SBAT may also be formed so that it is installed in the portable terminal 300 together with the main battery VBAT.

The power unit controller 40 controls on-and-off operations of the switch module 30 to supply power from the main battery VBAT and auxiliary battery SBAT to the portable terminal 300. The switch module 30 includes a first switch S1 and a second switch S2 in series between the main battery VBAT and auxiliary battery SBAT; a first node N1 between the first switch S1 and second switch S2, and connected to the power unit controller 40; a third switch S3 between the first switch S1 and the main battery VBAT; and a second node N2 between the first switch S1 and third switch S3, and connected to the TC 50, which acts as a charge connector to an external power source.

To charge the main battery VBAT and auxiliary battery SBAT with a charge current from an external power source, the TC 50 can be connected to the main battery VBAT via the third switch S3, and to the auxiliary battery SBAT via the first switch S1 and second switch S2.

Figure 4A:
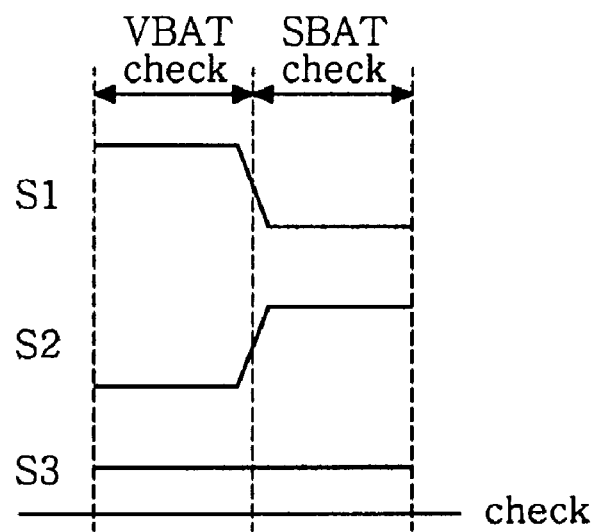
FIGS. 4A to 4C illustrate exemplary switch settings of the power supply unit of FIG. 3 according to exemplary usage modes.
Figure 4B:
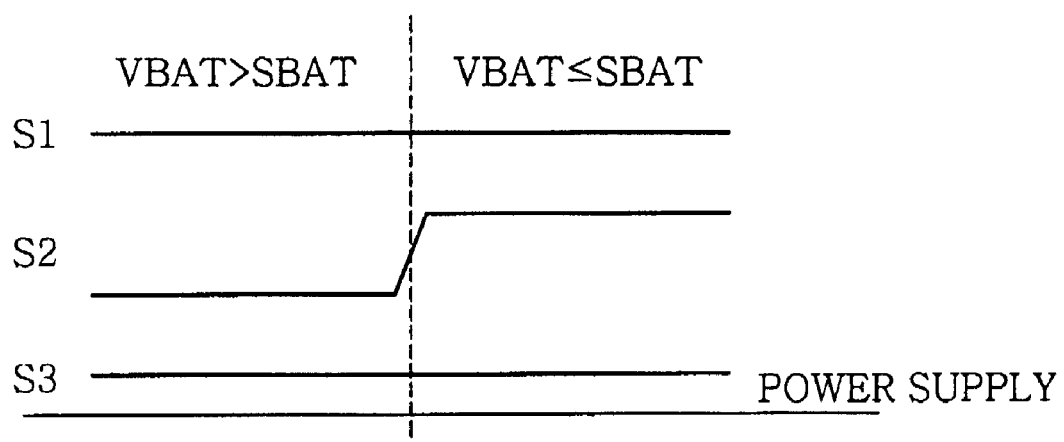
Figure 4C:
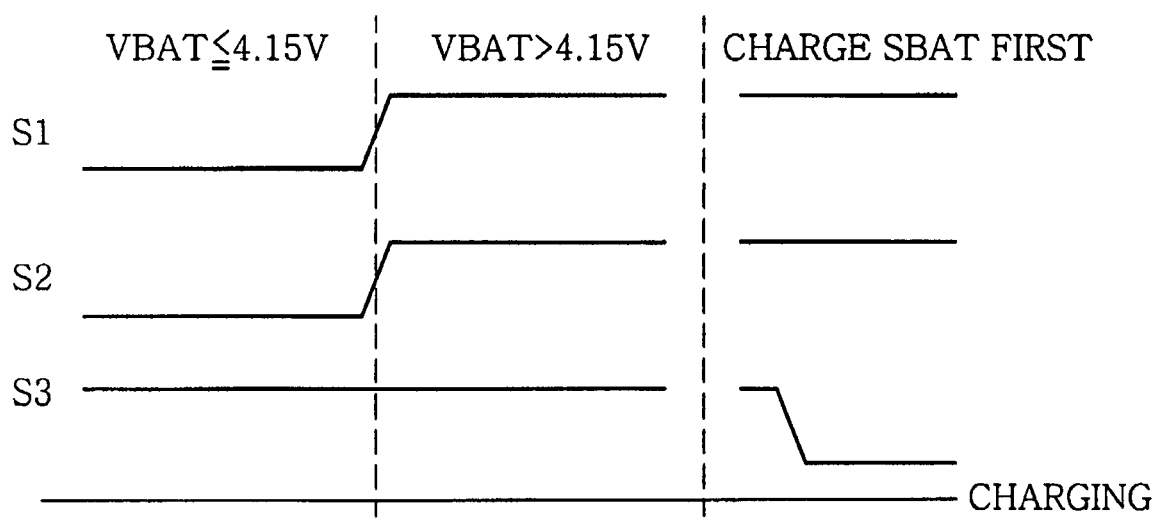

FIGS. 4A to 4C illustrate switch settings of the power supply unit 100 according to usage modes. FIGS. 4A to 4C are respectively related to measurement of battery levels of, power supply from, and charging of the main battery VBAT and auxiliary battery SBAT.

Referring to FIG. 4A, for measurement of the battery level of the main battery VBAT during a VBAT check period, the first switch S1 is 'on', the second switch S2 is 'off', and the third switch S3 is 'on'. Hence, a path is formed from the main battery VBAT through the third switch S3 and first switch S1 to the power unit controller 40. The power unit controller 40 measures the battery level of the main battery VBAT and sends the measured battery level data to the video processor 315, which then displays the measured battery level data on the display unit 317.

For measurement of the battery level of the auxiliary battery SBAT during an SBAT check period, the first switch S1 is 'off', the second switch S2 is 'on', and the third switch S3 is 'on' or 'off'. Hence, a path is formed from the auxiliary battery SBAT through the second switch S2 to the power unit controller 40. The power unit controller 40 measures the battery level of the auxiliary battery SBAT and sends the measured battery level data to the video processor 315, which then displays the measured battery level data, together with that of the main battery VBAT, on the display unit 317.

Although in FIG. 4A, during the SBAT check period, the third switch S3 is 'on', it may also be 'off' because the third switch S3 is unrelated to the path for measuring the battery level of the auxiliary battery SBAT. The power unit controller 40 may also separately display a combined battery level indicator by combining the measured battery level data of the main battery VBAT and auxiliary battery SBAT.

Referring to FIG. 4B, for power supply from the main battery VBAT and auxiliary battery SBAT, when the battery level of the main battery VBAT is higher than that of the auxiliary battery SBAT, the first switch S1 is 'on', the second switch S2 is 'off', and the third switch S3 is 'on'. Hence, a path is formed from the main battery VBAT through the third switch S3 and first switch S1 to the power unit controller 40, and power is supplied from the main battery VBAT to the power unit controller 40.

During this period, because of the off-state of the second switch S2, the main battery VBAT and the auxiliary battery SBAT are electrically separated from each other, thereby preventing an undesirable current from the main battery VBAT having a higher battery level to the auxiliary battery SBAT having a lower battery level.

Alternatively, when the battery level of the main battery VBAT is lower than or equal to that of the auxiliary battery SBAT, the first switch S1 is 'on', the second switch S2 is 'on', and the third switch S3 is 'on'. Hence, a path is formed from the main battery VBAT through the third switch S3, first switch S1 and second switch S2 to the auxiliary battery SBAT, and another path is formed from the main battery VBAT via the first node N1 to the power unit controller 40. Power from the auxiliary battery SBAT charges the main battery VBAT via the second switch S2, first switch S1 and third switch S3, and power from the main battery VBAT is supplied to the power unit controller 40.

In the case when both the main battery VBAT and auxiliary battery SBAT are installed, the power unit controller 40 repeatedly measures the battery levels of the main battery VBAT and auxiliary battery SBAT at regular intervals in order to determine the time to activate the auxiliary battery SBAT, that is, the time when the battery level of the VBAT becomes lower than or equal to that of the auxiliary battery SBAT owing to power utilization.

Referring to FIG. 4C, battery charging is described. For charging of the main battery VBAT, when the voltage of the main battery VBAT is lower than or equal to a preset voltage of 4.15V, the first switch S1 is 'off', the second switch S2 is 'off', and the third switch S3 is 'on'. Hence, a path is formed from the TC 50 through the third switch S3 to the main battery VBAT, and power supplied via the TC 50 from an external power source charges the main battery VBAT.

Battery full-charge voltages may differ from portable terminal to portable terminal, and are preset during terminal manufacturing processes. In the present invention, the full-charge voltage of the main battery VBAT is set equal to 4.15V, and the preset voltage may also be set to a voltage lower than 4.15V in consideration of charging of the auxiliary battery SBAT.

For charging of the auxiliary battery SBAT, when the voltage of the VBAT is higher than the preset voltage of 4.15V, the first switch S1 is 'on', the second switch S2 is 'on', and the third switch S3 is 'on' or 'off'. Hence, a path is formed from the TC 50 through the first switch S1 and second switch S2 to the auxiliary battery SBAT, and power supplied via the TC 50 from an external power source charges the auxiliary battery SBAT.

Although in FIG. 4C, during the SBAT charge period, the third switch S3 is 'on', the third switch S3 is, for example, retained to be 'off' because power supply to the main battery VBAT is unnecessary after charge completion thereof.

For priority charging of the auxiliary battery SBAT, the first switch S1 is 'on', the second switch S2 is 'on', and the third switch S3 is 'off'. Hence, a path is formed from the TC 50 through the first switch S1 and second switch S2 to the auxiliary battery SBAT, and power supplied via the TC 50 from an external power source charges the auxiliary battery SBAT prior to the main battery VBAT.

Figure 5:
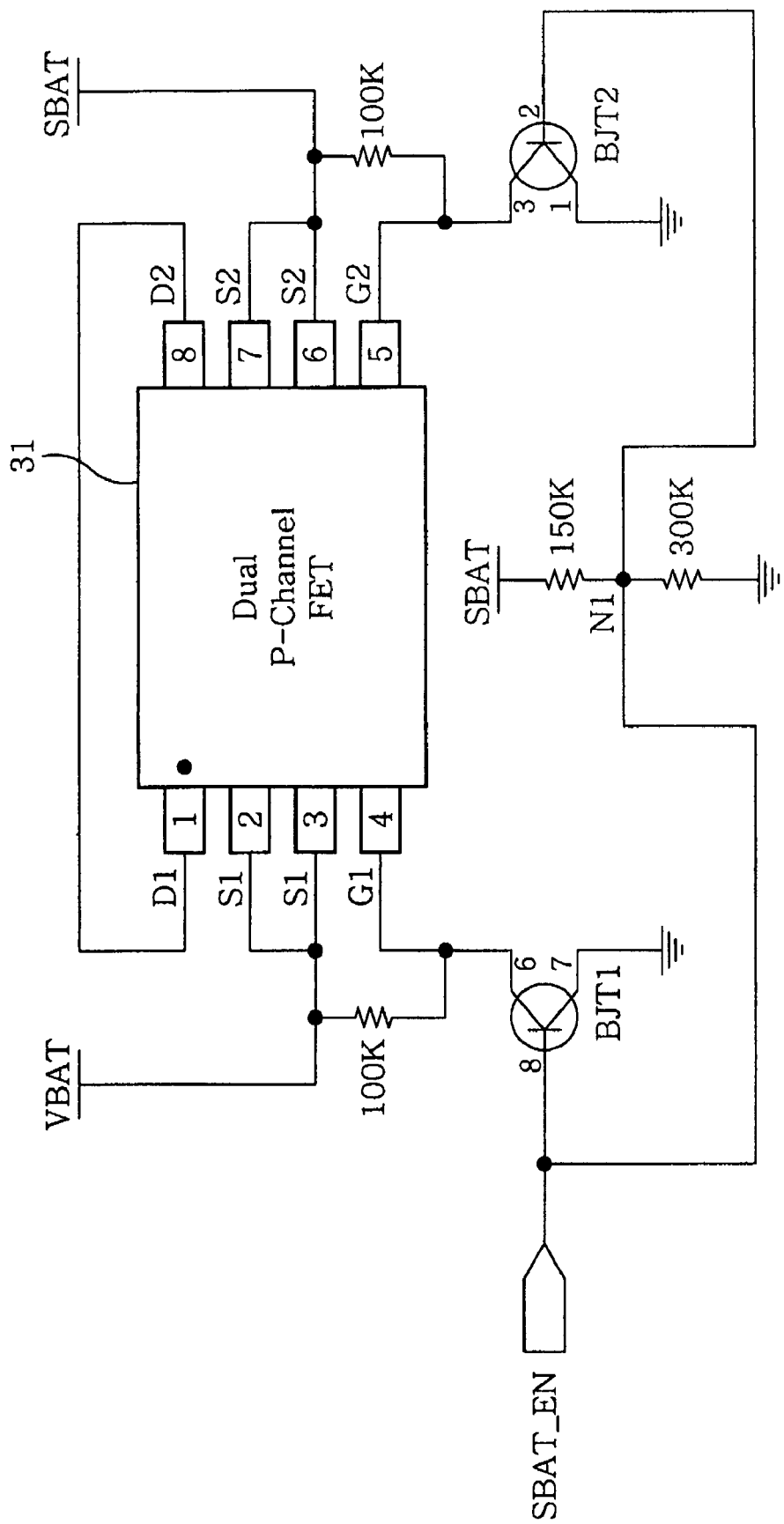
FIG. 5 illustrates an exemplary schematic circuit of the power supply unit of FIG. 3.

FIG. 5 illustrates a schematic circuit of a battery control switch as a realization of the switch module 30 of the power supply unit 100. Referring to FIG. 5, the battery control switch includes, for control of the auxiliary battery SBAT: a dual P-channel field effect transistor (FET) 31, a first bipolar junction transistor BJT1 connected to a gate lead of the dual P-channel FET 31, and a second bipolar junction transistor BJT2 connected to the other gate lead of the dual P-channel FET 31. A first source lead of the dual P-channel FET 31 is connected to the main battery VBAT, and a second source lead thereof is connected to the auxiliary battery SBAT. The dual P-channel FET 31 may be replaced with a plurality of diodes.

A secondary battery control signal SBAT_EN is fed to the base terminals of the BJT1 and the BJT2 for control of power supply of the auxiliary battery SBAT. The first node N1, between the base terminals of the first bipolar junction transistor BJT1 and second bipolar junction transistor BJT2, is connected to the auxiliary battery SBAT.

A resistor is connected between the auxiliary battery SBAT and first node N1, and another resistor is connected between the first node N1 and ground. The collector terminal of the first bipolar junction transistor BJT1 is connected to the main battery VBAT, and that of the second bipolar junction transistor BJT2 is connected to the auxiliary battery SBAT. The emitter terminals of the first and second bipolar junction transistors BJT1 and BJT2 are connected to ground. The collector terminal of the first bipolar junction transistor BJT1 is connected through a resistor to the main battery VBAT, and that of the second bipolar junction transistor BJT2 is connected through another resistor to the auxiliary battery SBAT.

In the case when the voltage level of the main battery VBAT is higher than a preset voltage of, for example, 4.15V, in response to connection of the TC 50, the battery control switch sets the secondary battery control signal SBAT_EN to 'high' and interconnects the main battery VBAT and auxiliary battery SBAT, thereby charging the auxiliary battery SBAT.

When the voltage level of the main battery VBAT is higher than that of the auxiliary battery SBAT, the battery control switch sets the secondary battery control signal SBAT_EN to 'low', thereby electrically isolating the auxiliary battery SBAT from the main battery VBAT and preventing a charge current from the main battery VBAT to the auxiliary battery SBAT.

When the voltage level of the main battery VBAT is lower than or equal to that of the auxiliary battery SBAT, the battery control switch sets the secondary battery control signal SBAT_EN to 'high' and interconnects the main battery VBAT and auxiliary battery SBAT to charge the main battery VBAT with a current from the auxiliary battery SBAT.

When the portable terminal 300 is turned off (namely, when the secondary battery control signal SBAT_EN cannot be controlled by the power unit controller 40), the main battery VBAT and auxiliary battery SBAT are interconnected for battery charging. That is, the auxiliary battery SBAT is connected to the base terminals of the first and second bipolar junction transistors BJT1 and BJT2, thereby pulling up the base terminals to turn on the first and second bipolar junction transistors BJT1 and BJT2. Hence, the main battery VBAT and auxiliary battery SBAT are interconnected for charging.

Figure 6:
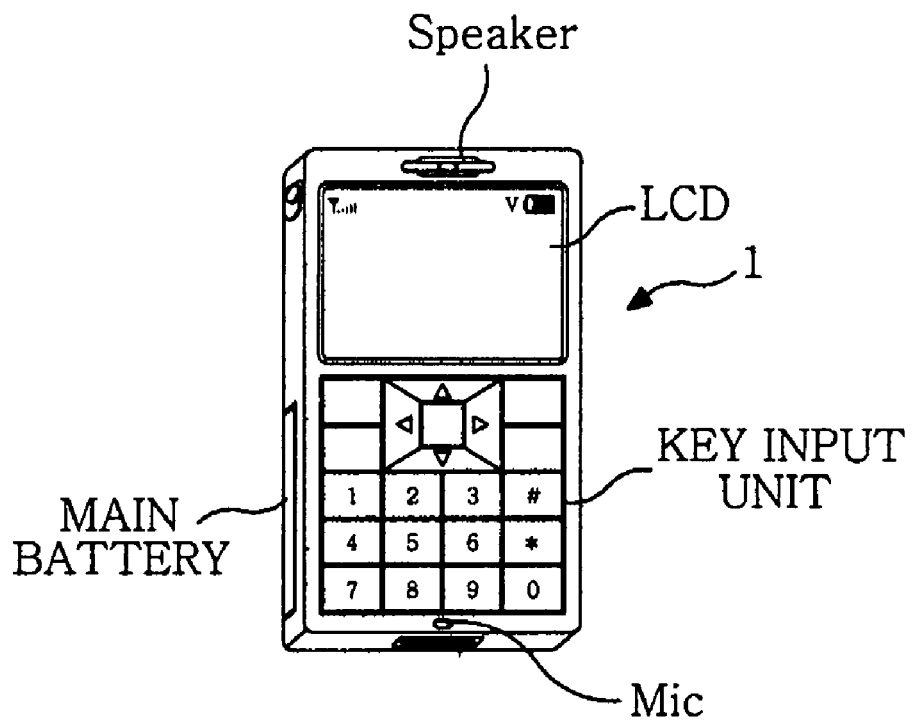
FIG. 6 shows perspective views of an exemplary external configuration of the portable terminal of FIG. 1.
Figure 6:
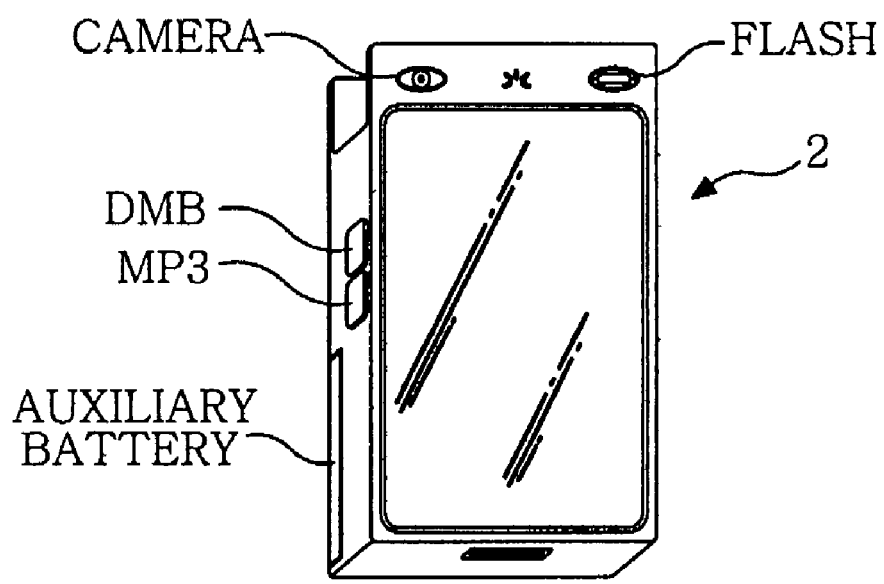

FIG. 6 shows perspective views of an external configuration of the portable terminal having an auxiliary battery.

Referring to FIG. 6, the portable terminal includes a main body 1 for installing basic call-processing components, and a secondary case 2 coupled to the main body 1 for installing the auxiliary battery and components related to added functions such as DMB reception, photographing and flashing, music playing, gaming, and audio recording. That is, the main body 1 and the secondary case 2 containing an auxiliary battery can be assembled to form a portable terminal of the present invention.

Figure 7:
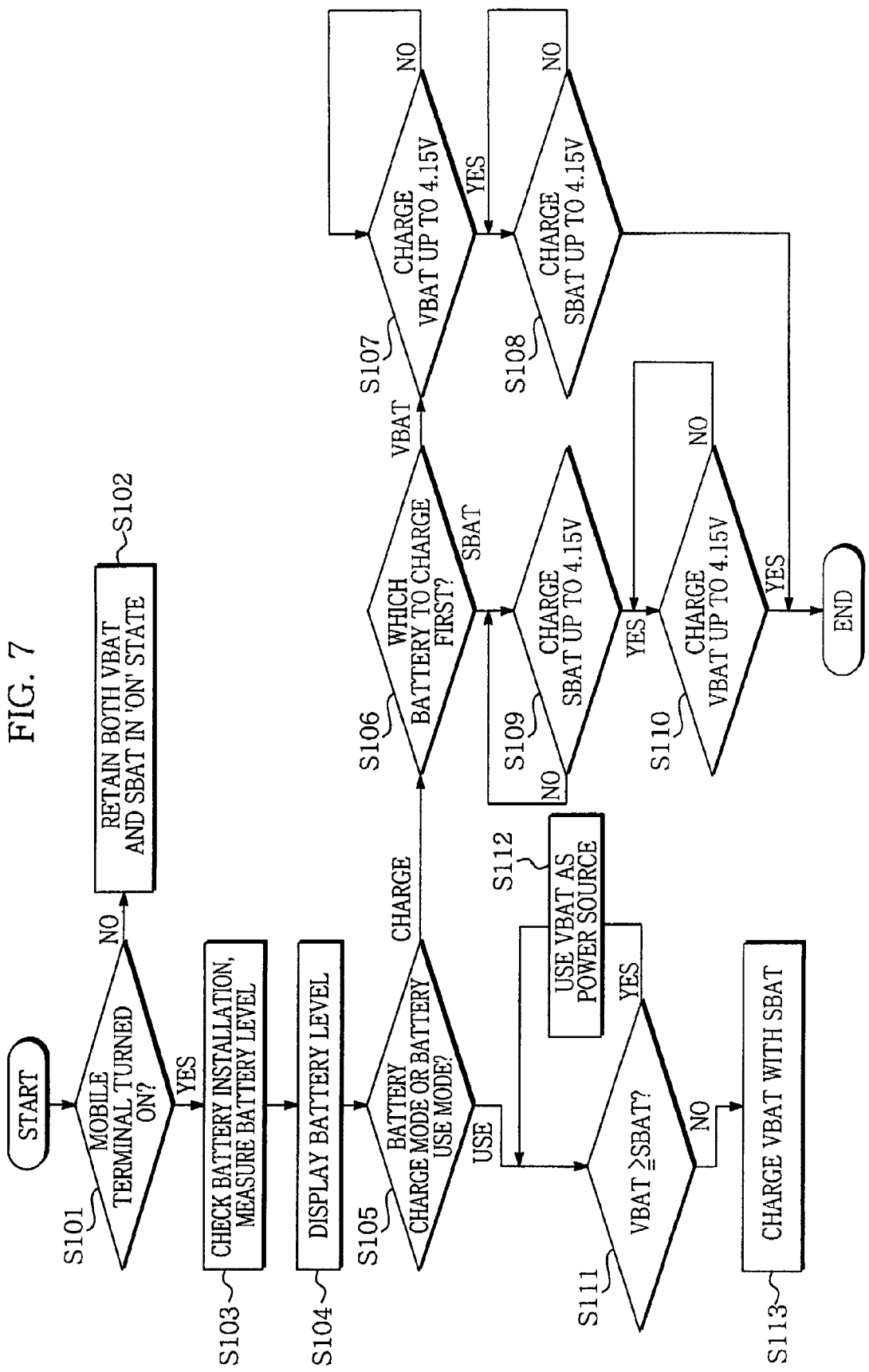
FIG. 7 is a flow chart illustrating exemplary steps of a power supply control method for a mobile terminal according to another exemplary embodiment of the present invention.

FIG. 7 is a flow chart illustrating steps of a power supply control method for a mobile terminal according to another exemplary embodiment of the present invention. Referring to FIG. 7, the power supply control method is described as follows.

The on-off state of the mobile terminal is identified (S101). If the mobile terminal is turned off, the main battery VBAT and auxiliary battery SBAT are retained in a connected state (S102), allowing both the main battery VBAT and the auxiliary battery SBAT to be charged if necessary.

If the mobile terminal is turned on, the power unit controller 40 checks installation of batteries, then checks the battery levels thereof by adjusting the on-off settings of the switch module 30 (S103).

At step S103, the power unit controller 40 forms a path between the power unit controller 40 and the main battery VBAT by turning on the first switch S1 and third switch S3 and by turning off the second switch S2, and measures the battery level of the main battery VBAT. Thereafter the power unit controller 40 forms a path between the power unit controller 40 and the auxiliary battery SBAT by turning off the first switch S1 and turning on the second switch S2, and measures the battery level of the auxiliary battery SBAT.

If the auxiliary battery SBAT is not installed, battery level measurement thereof is not performed. The power unit controller 40 determines that the auxiliary battery SBAT is installed if a signal from the auxiliary battery SBAT through the above path including the second switch S2 is detected.

The power unit controller 40 may periodically turn on the second switch S2 and checks whether an auxiliary battery SBAT is installed.

Thereafter, the power unit controller 40 sends the measured battery level data to the video processor 315, which then displays one or more battery level indicators, on the display unit 317, corresponding to the measured battery level data (S104). The battery level indicators may correspond to the main battery VBAT, the auxiliary battery SBAT, and a combination of these batteries, depending upon the installation of the auxiliary battery SBAT. If the auxiliary battery SBAT is not installed, a corresponding non-presence indicator may be displayed.

The power unit controller 40 determines whether the mobile terminal is in a battery charge mode or a battery use mode (S1105).

If the mobile terminal is in a battery charge mode, the power unit controller 40 determines which battery to charge first (S106).

To charge the main battery VBAT prior to the auxiliary battery SBAT, the power unit controller 40 turns on the third switch S3 and turns off the second switch S2, and controls charging of the main battery VBAT up to a preset voltage of, for example, 4.15V (S107). Thereafter, the power unit controller 40 turns off the third switch S3 and turns on the first switch S1 and second switch S2, and controls charging of the auxiliary battery SBAT up to the preset voltage (S108).

To charge the auxiliary battery SBAT prior to the main battery VBAT, the power unit controller 40 turns off the third switch S3 and turns on the first switch S1 and second switch S2, and controls charging of the auxiliary battery SBAT up to a preset voltage of, for example, 4.15V (S109). Thereafter, the power unit controller 40 turns on the third switch S3 and turns off the second switch S2, and controls charging of the main battery VBAT up to the preset voltage (S110).

If the mobile terminal is in a battery use mode at step S105, the power unit controller 40 compares the battery level of the main battery VBAT with that of the auxiliary battery SBAT (S111). If the battery level of the main battery VBAT is higher than that of the auxiliary battery SBAT, the power unit controller 40 turns off the second switch S2 to isolate the auxiliary battery SBAT from the main battery VBAT so that only the main battery VBAT is used as a power source (S112). This isolation of the auxiliary battery SBAT prevents charging of the auxiliary battery SBAT having a lower battery level with a charge current from the main battery VBAT having a higher battery level.

If the battery level of the main battery VBAT is lower than or equal to that of the auxiliary battery SBAT, the power unit controller 40 interconnects the main battery VBAT and auxiliary battery SBAT by turning on the first switch S1, second switch S2 and third switch S3, and controls charging of the main battery VBAT with a charge current from the auxiliary battery SBAT (S113).

As apparent from the above description, exemplary implementations of the present invention provide a portable terminal and power supply control method for the same. Main and auxiliary batteries can be used as linked or independent power sources for the portable terminal. When the battery level of the main battery is higher than that of the auxiliary battery, the main battery and auxiliary battery can be electrically isolated from each other, thereby blocking charging of the auxiliary battery with a charge current from the main battery. Hence, battery usage can be efficiently controlled. In addition, the main battery and auxiliary battery can be selectively charged according to a user request, and battery charge levels can be displayed on a screen in various manners for convenient viewing for the user.

While exemplary embodiments of the present invention have been shown and described in this specification, it will be understood by those skilled in the art that various changes or modifications are possible without departing from the spirit and scope of the invention as defined by the appended claims and their equivalents.

What is claimed is:

1. A portable terminal, comprising:
   a main battery for supplying power;
   an auxiliary battery for supplying power independently of the main battery;
   a switch module for controlling the power supply of the main battery and auxiliary battery; and
   a power unit controller for controlling on-off settings of the switch module for measuring a first charge level of the main battery and a second charge level of the auxiliary battery; for selectively supplying power from the main battery or from the auxiliary battery based on the measured first charge level and the measured second charge level; for disconnecting the auxiliary battery to the main battery if the measured first charge level of the main battery is higher than the measured second charge level of the auxiliary battery; and for connecting the auxiliary battery to the main battery if the measured first charge level of the main battery is lower than or equal to the measured second charge level of the auxiliary battery.

2. The portable terminal of claim 1, wherein the switch module comprises:
   a first switch and a second switch in series between the main battery and auxiliary battery; and
   a first node, between the first switch and second switch, connected to the power unit controller.

3. The portable terminal of claim 2, wherein for measurement of the first charge level, the first switch is turned on and the second switch is turned off, forming a path from the main battery through the first switch and first node to the power unit controller.

4. The portable terminal of claim 2, wherein for measurement of the second charge level, the first switch is turned off and the second switch is turned on, forming a path from the auxiliary battery through the second switch and first node to the power unit controller.

5. The portable terminal of claim 2, wherein when the main battery and auxiliary battery are installed in the portable terminal and the first charge level is higher than the second charge level, the first switch is turned on and the second switch is turned off, forming a path from the main battery through the first switch and first node to the power unit controller.

6. The portable terminal of claim 2, wherein when the main battery and auxiliary battery are installed in the portable terminal and the first charge level is lower than or equal to the second charge level, the first switch is turned on and the second switch is turned on, forming a path from the main battery through the first switch, first node and second switch to the auxiliary battery.

7. The portable terminal of claim 2, wherein when the main battery and auxiliary battery are installed in the portable terminal and the first charge level is lower than or equal to a certain voltage level in a battery charge mode, the second switch is turned off.

8. The portable terminal of claim 2, wherein when the main battery and auxiliary battery are installed in the portable terminal and the first charge level is higher than a certain voltage level in a battery charge mode, the first switch and the second switch are turned on.

9. The portable terminal of claim 2, wherein when the main battery and auxiliary battery are installed in the portable terminal and the portable terminal is turned off the main battery and auxiliary battery are interconnected.

10. The portable terminal of claim 2, wherein the switch module further comprises:
   a third switch between the main battery and first switch; and
   a second node, between the first switch and third switch, connectable to a charging module for charging the main battery and auxiliary battery.

11. The portable terminal of claim 10, wherein when the main battery and auxiliary battery are installed in the portable terminal, the third switch is turned off for charging the auxiliary battery prior to the main battery in a battery charge mode.

12. The portable terminal of claim 1, further comprising:
   a video processor for processing data indicative of at least one of the first charge level and the second charge level; and
   a display unit for displaying battery charge level indicators corresponding to the data processed by the video processor.

13. The portable terminal of claim 12, wherein the display unit comprises at least one of:
   a first area for displaying a first battery charge level indicator corresponding to the data indicative of the first charge level;
   a second area for displaying a second battery charge level indicator corresponding to the data indicative of the second charge level; and
   a third area for displaying a third battery charge level indicator corresponding to data indicative of a combined said first and second charge levels.

14. The portable terminal of claim 13, wherein the display unit displays only the first battery charge level indicator in the first area when only the main battery is installed in the portable terminal.

15. The portable terminal of claim 13, wherein the display unit displays the first charge level indicator in the first area and the second charge level indicator in the second area when the main battery and auxiliary battery are installed in the portable terminal,.

16. The portable terminal of claim 1, wherein the switch module comprises:
   a dual P-channel field effect transistor (FET), wherein a first source of the FET is connected to the main battery and a second source of the FET is connected to the auxiliary battery;
   a first bipolar junction transistor, having a collector connected to the main battery and to a first gate corresponding to the first source of the FET, and having a base connected to the auxiliary battery, wherein an enable signal is fed to the base; and
   a second bipolar junction transistor, having a collector connected to the auxiliary battery and to a second gate corresponding to the second source of the FET, and having a base connected to the auxiliary battery, wherein the enable signal is fed to the base.

17. The portable terminal of claim 1, wherein the auxiliary battery comprises at least one of a auxiliary battery internal to the portable terminal and a second auxiliary battery external to the portable terminal.

18. A power supply control method for a portable terminal having a main battery and an auxiliary battery, the method comprising:
   measuring at least one of a first charge level of the main battery and a second charge level of the auxiliary battery;
   selectively supplying the first power from the main battery or the second power from the auxiliary battery based on the measured first charge level and the measured second charge level;
   disconnecting, if the measured first charge level is higher than the second charge level, the auxiliary battery from the main battery; and
   connecting, if the measured first charge level is lower than or equal to the measured second charge level, the auxiliary battery to the main battery.

19. The power supply control method of claim 18, wherein the measuring comprises:
   checking a current state of battery installation; and
   forming a path to the main battery and measuring the first charge level.

20. The power supply control method of claim 18, wherein the measuring comprises:
   checking a current state of battery installation; and
   forming, if the auxiliary battery is installed, a path to the auxiliary battery and measuring the second charge level.

21. The power supply control method of claim 18, wherein the measuring further comprises displaying at least one of a first battery level indicator corresponding to the measured first charge level and a second battery level indicator corresponding to the measured second charge level.

22. The power supply control method of claim 21, wherein the measuring further comprises displaying, if the auxiliary battery is installed, a third charge level indicator corresponding to a combined the first and second charge levels.

23. The power supply control method of claim 18, wherein the connecting comprises:
   checking whether the portable terminal is in a battery charge mode or a battery use mode; and
   identifying, if the portable terminal is in the battery charge mode, whether to charge the main battery or the auxiliary battery first.

24. The power supply control method of claim 23, wherein the connecting further comprises charging first the main battery up to a certain voltage level and then charging the auxiliary battery.

25. The power supply control method of claim 23, wherein the connecting further comprises charging first the auxiliary battery up to a certain voltage level and then charging the main battery.

26. The power supply control method of claim 18, wherein the disconnecting comprises:
   comparing the first charge level with the second charge level;
   isolating, if the first charge level is higher than the second charge level, the auxiliary battery from the main battery; and
   supplying power using only the main battery.

27. The power supply control method of claim 18, wherein the connecting comprises:
   connecting, if the first charge level is lower than or equal to the second charge level, the auxiliary battery to the main battery; and
   charging the main battery with a charge current from the auxiliary battery.

28. The portable terminal of claim 12, wherein the power unit controller provides the data.

* * * * *